(12) United States Patent
Gorohata et al.

(10) Patent No.: US 6,910,257 B1
(45) Date of Patent: Jun. 28, 2005

(54) PRODUCTION METHOD OF A SEQUENTIALLY JOINED-SEGMENT STATOR COIL OF A ROTARY ELECTRICAL MACHINE

(75) Inventors: Tetsuya Gorohata, Anjo (JP); Youichi Kamakura, Anjo (JP); Hitoshi Hirano, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/601,999

(22) Filed: Jun. 24, 2003

(30) Foreign Application Priority Data

Jun. 25, 2002 (JP) .............................. 2002-184929

(51) Int. Cl.[7] ...................... H02K 15/00; H02K 15/14; H02K 15/16
(52) U.S. Cl. ........................... 29/596; 29/597; 29/598; 29/605; 29/732; 72/458; 242/599.1; 310/154.01; 310/156.01
(58) Field of Search .................... 29/596, 597, 598, 29/605, 732; 310/154.01, 156.01; 242/599.1; 72/458

(56) References Cited

U.S. PATENT DOCUMENTS

| | | | |
|---|---|---|---|
| 1,826,295 A | 10/1931 | Apple et al. | |
| 6,177,747 B1 | 1/2001 | Maeda et al. | |
| 6,249,956 B1 * | 6/2001 | Maeda et al. | 29/596 |
| 6,314,780 B1 | 11/2001 | Naka et al. | |
| 6,557,239 B2 * | 5/2003 | Takahashi et al. | 29/596 |
| 2002/0053126 A1 | 5/2002 | Maeda et al. | |
| 2003/0121139 A1 * | 7/2003 | Katou et al. | 29/596 |

FOREIGN PATENT DOCUMENTS

| | | |
|---|---|---|
| EP | 0 915 557 A1 | 5/1999 |
| JP | A 2000-139049 | 5/2000 |
| JP | B2 3118837 | 10/2000 |
| JP | A 2001-45721 | 2/2001 |
| JP | B2 3196738 | 6/2001 |

* cited by examiner

*Primary Examiner*—Carl J. Arbes
*Assistant Examiner*—Tim Phan
(74) *Attorney, Agent, or Firm*—Oliff & Berridge, PLC

(57) ABSTRACT

A production method of a polyphase sequentially joined-segment coil of a rotary electric machine and a product produced by the same are provided. A production machine includes pairs of tines working to catch heads of conductor segments when they are twisted using rings. The tines are designed to be rotatable about an axis of the rings following rotation of the rings to absorb stress acting on insulating coating on the heads of the segments to minimize rubbing of the insulating coatings, thereby ensuring a desired degree of electrical insulation of the stator coil.

5 Claims, 13 Drawing Sheets

PRODUCTION METHOD OF A SEQUENTIALLY JOINED-SEGMENT STATOR COIL OF A ROTARY ELECTRICAL MACHINE

CROSS-REFERENCE TO RELATED APPLICATION

The present application claims the benefit of Japanese application, JP 2002-184929 filed on Jun. 25, 2002.

BACKGROUND OF THE INVENTION

1. Technical Field of the Invention

The present invention relates generally to a sequentially joined-segment coil of a rotary electric machine and a production method thereof which ensures a high degree of electrical insulation.

2. Background Art

Sequentially joined-segment stator coils have been proposed which are made by conductor segments inserted in slots in a stator core whose ends are joined in sequence. For instance, Japanese Patent No. 3118837, assigned to the same assignee as that of this application, discloses a production method of joining U-shaped conductor segments in sequence to make a stator coil.

The sequentially joined segment stator coil, as taught in the above patents, is made by inserting a pair of legs of each conductor segment into two of slots of a core located at an interval away from each other which is substantially equivalent to a magnetic pole pitch of a rotor, bending end portions of the legs projecting from the slots in a circumferential direction of the core, and joining the end portions of the conductor segments in series.

The conductor segments each consist of a U or V-shaped head (also called a turn), a pair of side conductor portions extending from the head to be inserted into two of the slots of the core from an axial direction of the core, and end portions which project from the side conductor portions toward the other side of the slots and extend in the circumferential direction of the core. The projecting end portions are joined in pair. In the following discussion, the side conductor portion and the projecting end portion will also be referred to as a leg as a whole, the heads of the conductor segments will also be referred to as a segment head-side coil end of the stator coil, and the projecting end portions will also be referred to as a segment end-side coil end of the stator coil.

Japanese Patent Publication No. 3118837 also discloses a method of forming slant portions of a head of each of a small-sized conductor segment and a large-sized segment. The formation of the slant portions is achieved by fitting a total of four legs of a set of the small-sized conductor segment and the large-sized segment extending over the small-sized segment within two rings arrayed coaxially with each other and rotating the rings in opposite directions to spread the legs in circumferential directions of the rings.

Japanese Patent First Publication No. 2000-139049 discloses a method of forming the slant portions of the head of each conductor segment which is achieved by fitting a total of four legs of a set of the small-sized conductor segment and the large-sized segment extending over the small-sized segment within four rings arrayed coaxially with each other and rotating the rings in opposite directions to spread the legs of each conductor segment in circumferential directions of the rings.

Further, Japanese Patent First Publication No. 2001-45722 discloses a production method of the above small-sized conductor segment and the large-sized conductor segment.

The production methods of the sequentially joined-segment stator coil as taught in the above publications will be discussed below in detail.

First, a required number of pine needle-like conductor segments are prepared. Each of the conductor segments is formed into a U-shape one with side conductor portions extending at substantially a magnetic pole pitch interval away from each other. The side conductor portions of each conductor segment are placed spatially in alignment with two of the slots formed in the core, respectively, (i.e., in a circumferential direction of the core) for simultaneous insertion of the side conductor portions into the slots. These steps may be achieved with a pair of coaxially arrayed rings with slots, as illustrated in FIG. 3 of Japanese Patent No. 3118837. Specifically, legs of each conductor segment are fitted in two of the slots aligned in a radius direction of the rings. Next, the rings are turned relative to each other through a given angle equivalent to a magnetic pole pitch to spread the legs, thereby forming the U-shaped conductor segment.

Subsequently, the head of each of the U-shaped conductor segments is held. The legs are drawn from the slots and then inserted into the slots of the core.

Next, end portions of the legs projecting from the slots are bent in the circumferential direction of the core through half a magnetic pole pitch. Such bending may be achieved with a plurality of coaxially arrayed rings with slots, as illustrated in FIGS. 4 and 5 of Japanese Patent No. 03196738. Specifically, tips of the projecting end portions of the legs are inserted into the slots of the rings. The rings are rotated in the circumferential direction by half a magnetic pole pitch (i.e., an electrical angle of $\pi/2$) to bent the projecting end portions in the circumferential direction through half the magnetic pole pitch. It is advisable that the rotation of the rings be performed while urging the rings toward the projecting end portions (i.e., the axial direction of the core) for increasing the radius of curvature of the turn of each conductor segment. Next, the projecting end portions are welded in a given sequence, thereby forming an endless phase coil. Any one of the heads of the U-shaped conductor segments is cut to define coil terminals. If the coil terminals are made longer and bent in the circumferential direction, they may be employed as a neutral point connecting line. The reason that the coil terminals are provided in the segment head-side coil end is because if the coil terminals are provided in the segment end-side coil end, they will interface with welding of the end portions of the conductor segments.

The above sequentially joined-segment stator coil is usually employed as a stator coil of automotive ac generators and has suffered from the following drawback.

The spreading of the legs of the small-sized and large-sized conductor segments is, as described above, achieved by fitting the two legs of each conductor segment within a large one and a small one of the rings, respectively, and rotating the rings equi-angles in opposite directions. The head of each conductor segment before the legs are spread is caught by a pair of tines arrayed in the circumferential direction of the rings.

Each of the tines has a chamfered surface which is to abut the head of each conductor segment in order to avoid the damage to an insulating film or coating on the tip of the head of each conductor segment resulting from bending thereof in the circumferential direction of the rings by the tines during the rotation of the rings. However, when the outer and inner rings are rotated at the same angular speed or through the same angle, a difference in diameter of the outer and inner rings will cause an outer one of the legs placed in the outer ring to undergo tension stress stronger than that acting on the inner leg. The tension stress acts between the tip of the head of each conductor segment and a side portion of the chamfered surface of the tine abutting the tip, which causes the damage to the insulating coating on the tip.

SUMMARY OF THE INVENTION

It is therefore a principal object of the invention to avoid the disadvantages of the prior art.

It is another object of the invention to provide a sequentially joined-segment stator coil for a rotary electric machine which is designed to ensure a desired degree of electrical insulation of conductor segments of the stator coil and a production method thereof.

According to one aspect of the invention, there is provided a method of producing a sequentially joined-segment stator coil of a rotary electrical machine which may be employed as a three-phase DC motor. The method comprises: (a) preparing segments each including a head and a pair of legs extending straight in parallel to each other from ends of the head, the head being made up of a substantially U-shaped tip portion and a pair of head straight portions extending from the tip portion in alignment with the legs; (b) preparing a plurality of rings arrayed coaxially with each other to be rotatable relative to each other; (c) holding the legs of each of the segments in the rings, respectively; (d) catching the tip portion of the head of each of the segments through a pair of tines in abutment to the tip portion in a circumferential direction of the rings, the tines being installed on a head press member which is disposed away from the rings in an axial direction of the rings and so designed as to be movable selectively to and away from the rings; (e) moving the head press member toward the rings and, at the same time, rotating the rings in opposite directions to spread the legs of each of the segments through a given angle, thereby twisting the head straight portions of each of the heads to form head slant portions; (f) removing the segments from the rings and the tines and inserting the segments into slots in a stator core; and (g) joining the segments in the stator core in sequence to complete a stator coil. The head press member retains each of the pairs of tines to be rotatable about an axis extending in alignment with an axis about which the rings rotate. Each of the pairs of tines is allowed to rotate following rotation of the rings.

Specifically, the tines are allowed to rotate to absorb torque exerted by the segments during rotation of the rings, thus resulting in a decrease in stress acting on insulating coating on the tip portions of the heads of the segments, which ensures the electrical insulation of the stator coil.

According to another aspect of the invention, there is provided a sequentially joined-segment stator coil of a rotary electric machine produced by the production method as described above. An angle, as measured from a vertex defined on an axis of the stator coil, between a center of the tip portion of the head of each of the segments as defined in a circumferential direction of the stator coil and an outer one of the legs of the segment is smaller than an angle between the center and an inner one of the legs. This results in a decrease in stress acting on insulating coating on the tip portions of the heads of the segments, which ensures a desired degree of electrical insulation of the stator coil.

According to the third aspect of the invention, there is provided a production method of a sequentially joined-segment stator coil of a rotary electric machine, which comprises: (a) preparing segments each including a head and a pair of legs extending straight in parallel to each other from ends of the head, the head being made up of a substantially U-shaped tip portion and a pair of head straight portions extending from the tip portion in alignment with the legs; (b) preparing a plurality of rings arrayed coaxially with each other to be rotatable relative to each other; (c) holding the legs of each of the segments in the rings, respectively; (d) catching the tip portion of the head of each of the segments through a pair of tines in abutment to the tip portion in a circumferential direction of the rings, the tines being installed on a head press member which is disposed away from the rings in an axial direction of the rings and so designed as to be movable selectively to and away from the rings; (e) moving the head press member toward the rings and, at the same time, rotating the rings in opposite directions to spread the legs of each of the segments through a given angle, thereby twisting the head straight portions of each of the heads to form head slant portions; (f) removing the segments from the rings and the tines and inserting the segments into slots in a stator core; and (g) joining the segments in the stator core in sequence to complete a stator coil.

One of each pair of the tines which is urged inwardly of the rings by the tip portion of the head of a corresponding one of the segments has a first chamfered surface to abut to the tip portion. The other tine which is urged outward of the rings by the tip portion of the head of the corresponding one of the segments has a second chamfered surface to abut to the tip portion. The first chamfered surface is greater in area than the second chamfered surface.

Specifically, one of each pair of the tines subjected to a stronger stress during the twisting of the head straight portions has the chamfered surface larger than that of the tine subjected to a weaker stress, thereby causing a curve of a boundary between the tip portion and an outer one of the outer head straight portions of the head to be greater than that of a boundary between the tip portion and the inner head straight portion, which results in a decrease in stress acting on these. This ensures a desired degree of electrical insulation of the stator core.

According to the fourth aspect of the invention, there is provided a sequentially joined-segment stator coil of a rotary electrical machine, which comprises: (a) a stator core having opposed ends and slots formed at given intervals in a circumferential direction of the stator core, each of the slots defining therein even segment-inserted positions which are aligned in a radius direction of the stator core; (b) a plurality of segments placed in the slots of the stator core, the segments being joined in sequence to form turns of each of M (=three or more) phase coils, each of the segments including a pair of conductor portions each of which is inserted into one of two of the slots spaced from each other at a given interval, a head portion extending from the pair of conductor portions outside one of the ends of the stator core to form a segment head-side coil end, and a pair of end portions each of which extends from one of the pair of conductor portions outside the other end of the stator core to form a segment end-side coil end, each of the head portions being made up of a substantially U-shaped tip portion and a pair of slant portions which continue from ends of the head portion, slant to a circumferential and an axial direction of the stator core, and lead to the conductor portions, respectively, each of the end portions being made up of slant end portions slanting from the two of the slots to the circumferential and axial directions and tips each of which continues from one of the slant end portions and is joined to one of the tips of the end portions of another of the segments, the segment head-side coil end including a plurality of sets of the head portions arrayed in the radius direction of the stator core, as viewed in the circumferential direction of the stator core, the segment end-side coil end including a plurality of sets of the end portions arrayed in the radius direction, as viewed in the circumferential direction of the stator core.

A boundary portion between the tip of the head of each of the segments and an outer one of the slant portions of the head of the each of the segments has a radius of curvature greater than that of a boundary portion between the tip of the head of each of the segments and an inner one of the slant portions of the head of the each of the segments, as measured in the axial direction of the stator core. This provides a desired degree of electrical insulation of the stator coil.

In a sequentially joined-segment stator coil according to the second or fourth aspect of the invention, the segments are broken down into a plurality of segment sets each made up of a small-sized segment with a small head and a large-sized segment with a large head extending over the small head of the small-sized segment in the circumferential direction of the stator core. The segment sets are broken down into a plurality of segment set groups arrayed in the radius direction of the stator core. The segment sets in each of the segment set groups are arrayed in the circumferential direction of the stator core. Each of the segment set groups forms partial phase windings to which given phase voltages are applied, respectively. Each of the phase coils includes ones of the partial phase windings which are arrayed in the radius direction of the stator core and joined in series.

Sequentially joined-segment stator coils are typically employed as automotive ac generator, but however, now expected to be used for automotive high power drive motors to produce torque to drive an automobile. It is necessary to supply an extremely high voltage (e.g., a few hundred voltages) to such drive motors in order to compensate for a loss thereof caused by resistances of wiring and the stator coil. However, service speeds of the both are substantially identical, thus requiring the sequentially joined-segment stator coil for the automotive drive motor to have turns greater in number than the one for the automotive ac generator. The increase in turns may be, as shown in FIG. 13, by laying segments 33a, 33b, 33c, 33d, and 33e to overlap each other to increase conductor portions arrayed in the slot S in a radius direction of the stator core 1. This multi-lap segment structure, however, encounters drawbacks that types of segments needs to be increased with an increase in lap of the segments, and a head of an outermost one of the segments has a greater length, thus resulting in an increase in electrical resistance thereof.

Particularly, although not illustrated clearly in FIG. 13, the width of the tip H of each segment is commonly greater than that of legs L thereof for production reasons. This causes the width W of the segment head-side coil end 311 of the stator coil to be great and also the distance of the segment head-side coil end 311 projecting from an end of the stator core 1 to be great, thus resulting in an increase in overall size and weight of the stator coil.

Additionally, the multi-lap segment structure also has drawbacks in that the greater width of the tips H of the segments results in a great degree of rubbing thereof, and the clearance d between adjacent two of the legs H of the segments needs to be increased for avoiding the rubbing, which results in a decrease in space factor of the stator coil and that the laps of the segments lead to the deterioration in heat dissipation from the segment 33a.

In order to avoid the above problems, in the sequentially joined-segment stator coil, as described above, each set of the large-sized and small-sized segments has legs disposed, as shown in FIG. 3, in adjacent four of the slots arrayed in the radius direction of the stator core 1. The segment sets arrayed in the circumferential direction of the stator core 1 are joined in series to form each of the partial phase windings. The partial phase windings arrayed adjacent each other in the radius direction of the stator core 1 are joined in series to form each of the phase coils.

In the above described sequentially joined-segment stator coil of the invention, the slots are broken down into same phase slot groups each of which has placed therein the conductor portions of the segments to which the same phase voltage is applied. The slots in each of the same phase slot groups are arrayed adjacent to each other in the circumferential direction of the stator core. The partial phase windings arrayed in the radius direction of the stator core within each of the slots of each of the same phase slot groups are joined in series to form a series-connected phase coil circuit. The series-connected phase coil circuits placed respectively within the slots of each of the same phase slot groups are joined in parallel to form each of the phase coils. The parallel joint results in decreases in variation in resistance among the series-connected phase coil circuits and in electrical current flowing therethrough.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
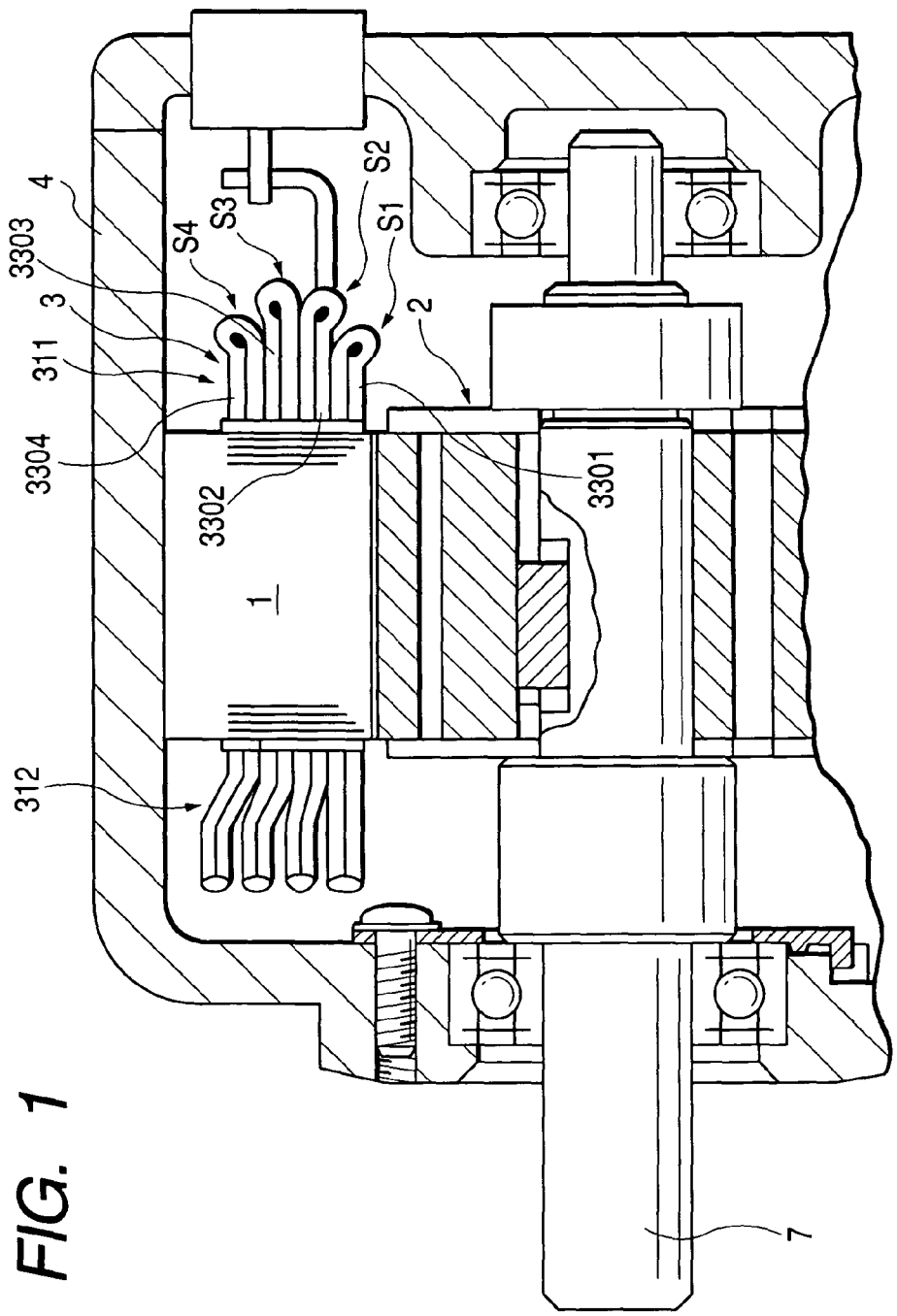
FIG. 1 is a partially longitudinal sectional view which shows a rotary electrical machine equipped with a stator coil according to the invention.

Referring to the drawings, wherein like reference numbers refer to like parts in several views, particularly to FIG. 1, there is shown a high-voltage rotary electrical machine for automotive vehicles according to the invention which is equipped with a sequentially joined-segment stator coil.

The rotary electrical machine may be used as a drive motor designed to produce power to drive an automotive vehicle such as an electric automobile. The rotary electrical machine consists essentially of a stator core 1, a rotor 2, a stator coil 3, a housing 4, and a rotary shaft 7. The stator core 1 is fixed to an inner peripheral wall of the housing 4. The stator coil 3 is wound in slots formed in the stator core 1. The rotor 2 is of an IPM type which is installed on the rotary shaft 7 supported rotatably by the housing 4 through bearings. The rotor 2 is disposed within the stator core 1. The stator coil 3 is implemented by a three-phase armature winding and supplied with power from a three-phase inverter leading to an external battery designed to develop approximately 300 V.

The rotary electrical machine may be a permanent magnet three-phase brushless DC motor (synchronous motor) designed to produce drive power required to drive a storage battery-powered vehicle, a fuel cell-powered vehicle, or a hybrid vehicle. The rotor structure may be a variety of know structure, and explanation thereof in detail will be omitted here.

Figure 2:
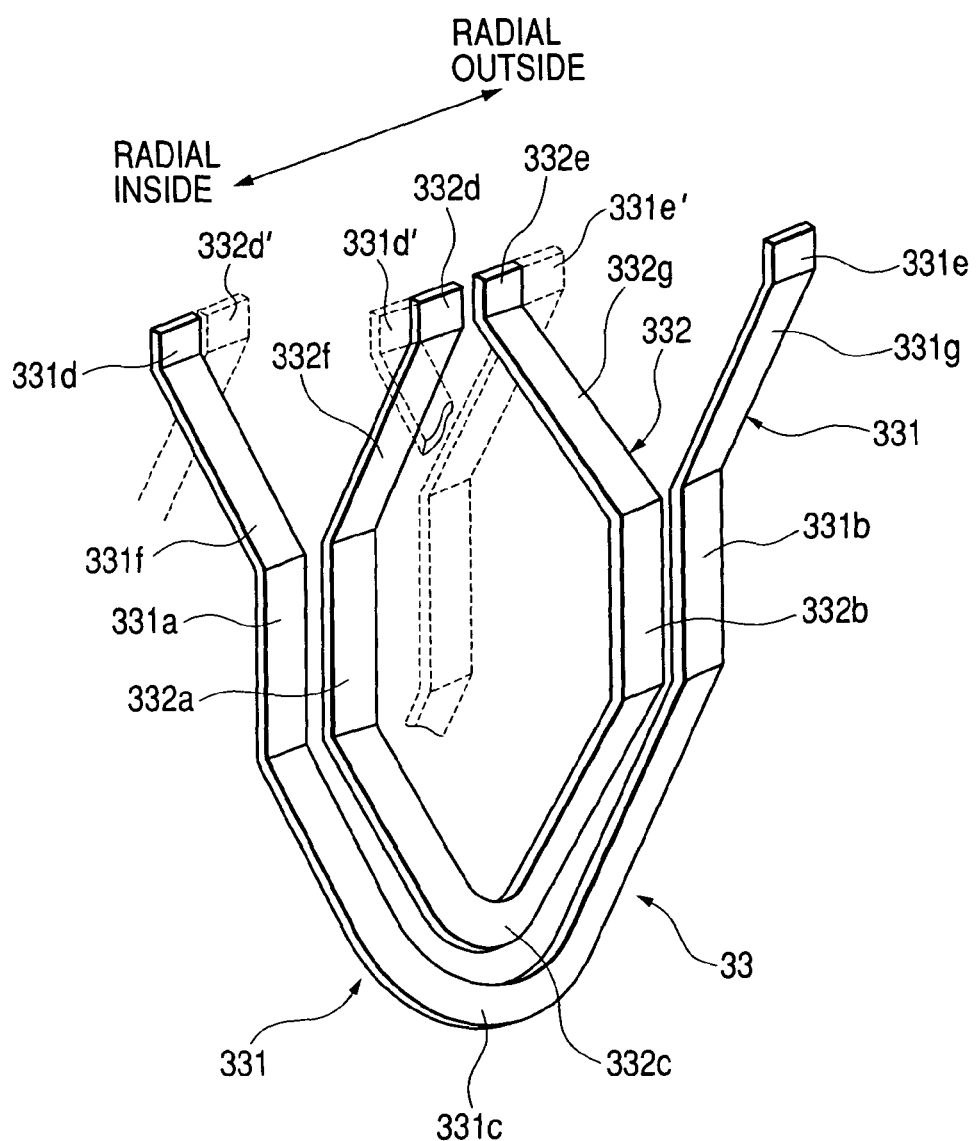
FIG. 2 is a perspective view of a set of a small-sized conductor segment and a large-sized conductor segment extending over the small-sized conductor segment of a stator coil.
Figure 3:
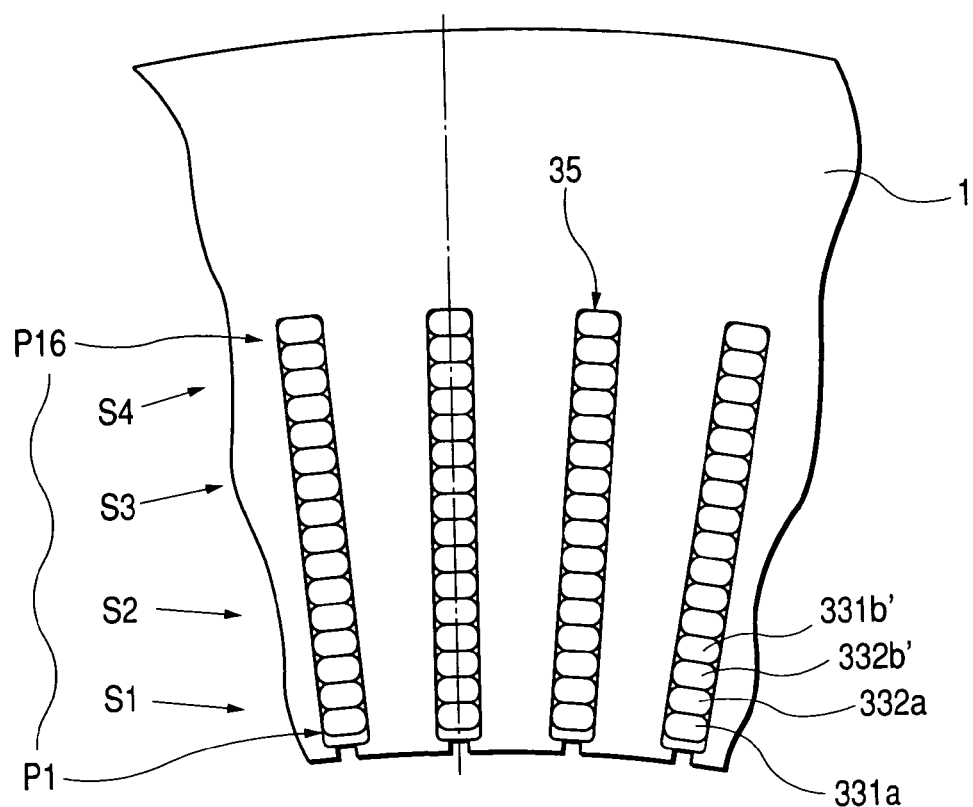
FIG. 3 is an enlarged partial view which shows arrays of conductor segments within slots of a stator core.

The stator coil 3 is made up of sequentially joined conductor segments 33, as shown in FIG. 2, placed within slots 35, as shown in FIG. 3, formed in the stator core 1. The conductor segments 33 are inserted into the slots 35 from one end of the stator core 1 to have legs thereof project from the other end of the stator core 1. The legs of the conductor segments 33 are twisted or expanded through an electrical angle $\pi/2$ in a circumferential direction of the stator core 1 and welded at ends thereof in a unit of a predetermined number of legs. The conductor segments 33 are covered with a resinous film except the welded ends and each made of a U-shaped strip. Such a stator coil structure is well known in, for example, U.S. Pat. Nos. 6,201,332 B1, 6,249,956 B1, and 6,404,091 B1, all assigned to the same assignee as that of this application, disclosure of which is incorporated therein by reference.

The conductor segments 33 are each made up of a U- or V-shaped head, a pair of side conductor portions extending straight from ends of the head which are to be inserted into the slots 35 (will also be referred to as slot-inserted portions below), and end portions which continue from the side conductor portions and project outside the slots 35 when the side conductor portions are placed within the slots 35. The conductor segments 33 are broken down into two types: a large-sized conductor segment 331 and a small-sized conductor segment 332 which will also be referred to as a segment set below. Each of the end portions projects from a front end of the stator core 1 and welded to one of the end portions 34 of another conductor segment 33 to form a segment end-side coil end 312, as illustrated in FIG. 1, which extends in the circumferential direction of the stator core 1 in the form of a ring. The head of each of the conductor segments 33 projects from a rear end of the stator core 1 to form a segment head-side coil end 311 which extends in the circumferential direction of the stator core 1 in the form of a ring.

As clearly shown in FIG. 1, four sets of the conductor segments 22 are placed within each of the slots 35 in alignment in a radius direction of the stator core 1. In the following discussion, groups, each of which is made up of sets of the conductor segments 33 arrayed in the circumferential direction thereof, will be designated at S1, S2, S3, and S4 from inside to outside of the stator core 1. Numeral 3301 indicates the heads of the conductor segments 33 in the innermost group S1, numeral 3302 indicates the heads of the conductor segments 33 in the second-innermost group S2, numeral 3303 indicates the heads of the conductor segments 33 in the third-innermost group S3, and numeral 3304 indicates the heads of the conductor segments 33 in the outermost group S4. The four groups S1 to S4 form the segment head-side coil end 311. In FIG. 1, only the eight end portions of the conductor segments 33 defining the segment end-side coil end 312 in two of the groups S1 to S4 (i.e., four pairs of the conductor segments 33) are shown for the brevity of illustration.

Each set of the conductor segments 33 is, as described above, made up of the large-sized conductor segment 331 and the small-sized conductor segment 332. The large-sized conductor segment 331, as can be seen in FIG. 2, surrounds or extends over the small-sized conductor segment 332.

The large-sized conductor segment 331 consists of the head portion 331c, the slot-inserted portions 331a and 331b, and the end portions 331f and 331g. The end portions 331f and 331g are welded at tips 331d and 331e which will also be referred to as welds below. An inner and an outer one of the slot-inserted portions 331a and 331b will also be referred to as an innermost and an outermost slot-inserted portions 331a and 331b, respectively.

The small-sized conductor segment 332 consists of the head portion 332c, the slot-inserted portions 332a and 332b, and the end portions 332f and 332g. The end portions 332f and 332g are welded at tips 332d and 332e which will also be referred to as welds below. An inner and an outer one of the slot-inserted portions 332a and 332b will also be referred to as a middle inside slot-inserted portion 332a and a middle outside slot-inserted portion 332b, respectively.

In FIG. 2, each reference number with a dash (') denotes the same portion as that referred to by a like reference number with no dash. In the illustrated example, the tips 331d and 332d' located adjacent each other in the radius direction of the stator core 1 are welded together. Similarly, the tips 332d and 331d' and the tips 332e and 331e' are welded together.

In the example as illustrated in FIG. 2, the innermost slot-inserted portion 331a and the outermost slot-inserted portion 331b of the conductor segment 331 are placed within ones of the slots 35 spaced from each other at odd magnetic pole pitches T (e.g., one magnetic pole pitch, as expressed in an electrical angle $\pi$). Similarly, the middle inside slot-inserted portion 332a and the middle outside slot-inserted portion 332b of the conductor segment 332 are placed within ones of the slots 35 spaced from each other at the same odd magnetic pole pitches as that of the conductor segment 331. The head portion 332c of the small-sized conductor segment 332 is located inside the head portion 331c of the large-sized conductor segment 331.

The stator core 1 has, as clearly shown in FIG. 3, the slots 35 having a length extending in the radius direction thereof. Within each of the slots 35, sixteen of the slot-inserted portions of the conductor segments 33 are arrayed in line or aligned in the radius direction of the stator core 1. In the following discussion, the sixteen slot-inserted portions placed in each of the slots 35 will also be referred to as a first layer to a sixteenth layer, respectively, from inside to outside of the core 2. The locations of the first to sixteenth layers in each of the slots 35 will also be referred to below as a first layer position P1 to a sixteenth layer position P16, respectively. In each of the slots 35, the four segment set groups S1 to S4 are arrayed in sequence in the radius direction of the stator core 1. Specifically, the segment set group S1 occupies the first to fourth layer positions P1 to P4. The segment set group S2 occupies the fifth to eighth layer positions P5 to P8. The segment set group S3 occupies the ninth to twelfth layer positions P9 to P12. The segment set group S4 occupies the thirteenth to sixteenth layer positions P13 to P16.

Figure 4:
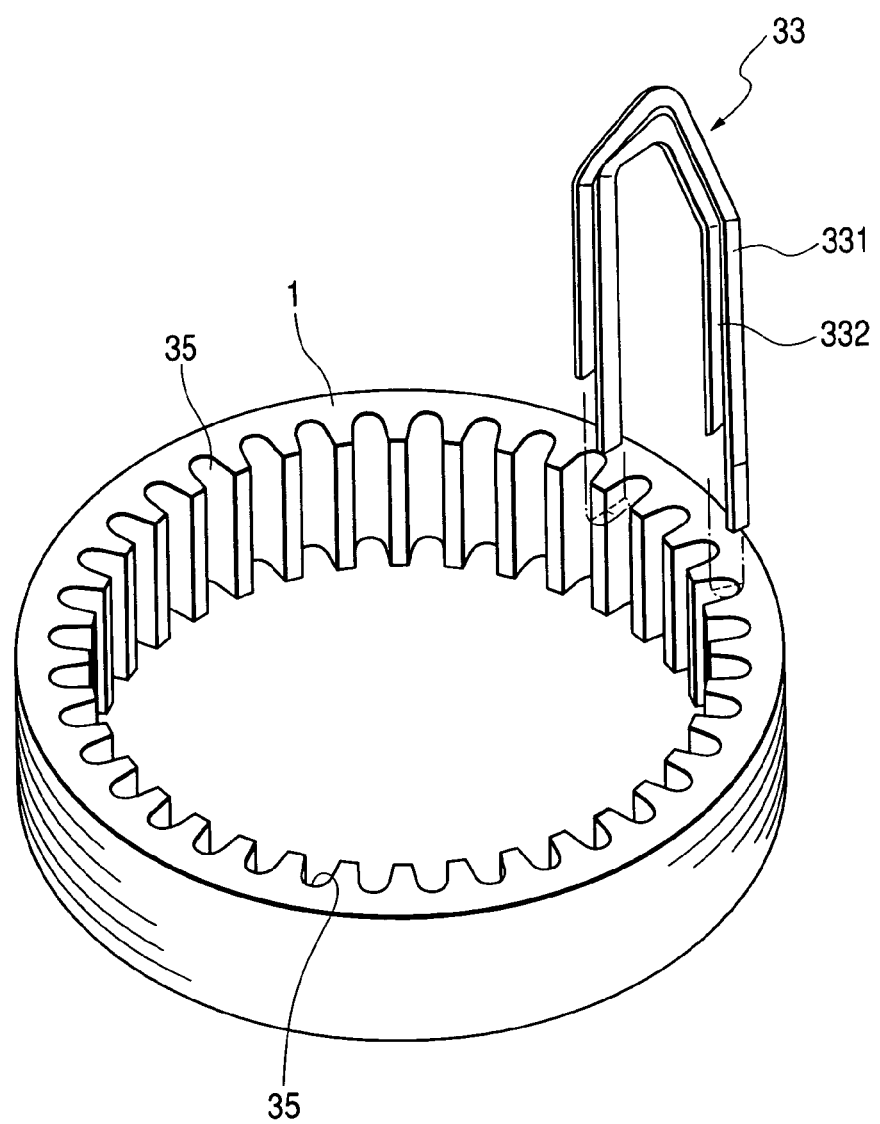
FIG. 4 is a perspective view which slows a set of a small-sized conductor segment and a large-sized conductor segment immediately before they are inserted into a stator coil.

In an individual segment set group, as for example, in the innermost segment set group S1, the innermost slot-inserted portion 331a of one of the conductor segments 331 is placed at the innermost position or the first layer position P1 within the slot 35. The middle inside slot-inserted portion 332a, the middle outside slot-inserted portion 332b', and the outermost slot-inserted portion 331b' are arrayed at the second, the third, and the fourth layer positions P2, P3, and P4, respectively. The middle outside slot-inserted portion 332b' and the outermost slot-inserted portion 331b', as described above, belong to the small-sized conductor segment 332 and the large-sized conductor segment 331 which are different from those of the middle outside slot-inserted portion 332b and the outermost slot-inserted portion 331b, respectively. The other segment set groups S2 to S4 are also placed in the slots 35 in the same manner as that of the segment set group S1, and explanation thereof in detail will be omitted here. FIG. 4 illustrates a set of the large-sized conductor segment 331 and the small-sized conductor segment 332 immediately before they are inserted into the slots 35 of the stator core 1.

Figure 9:
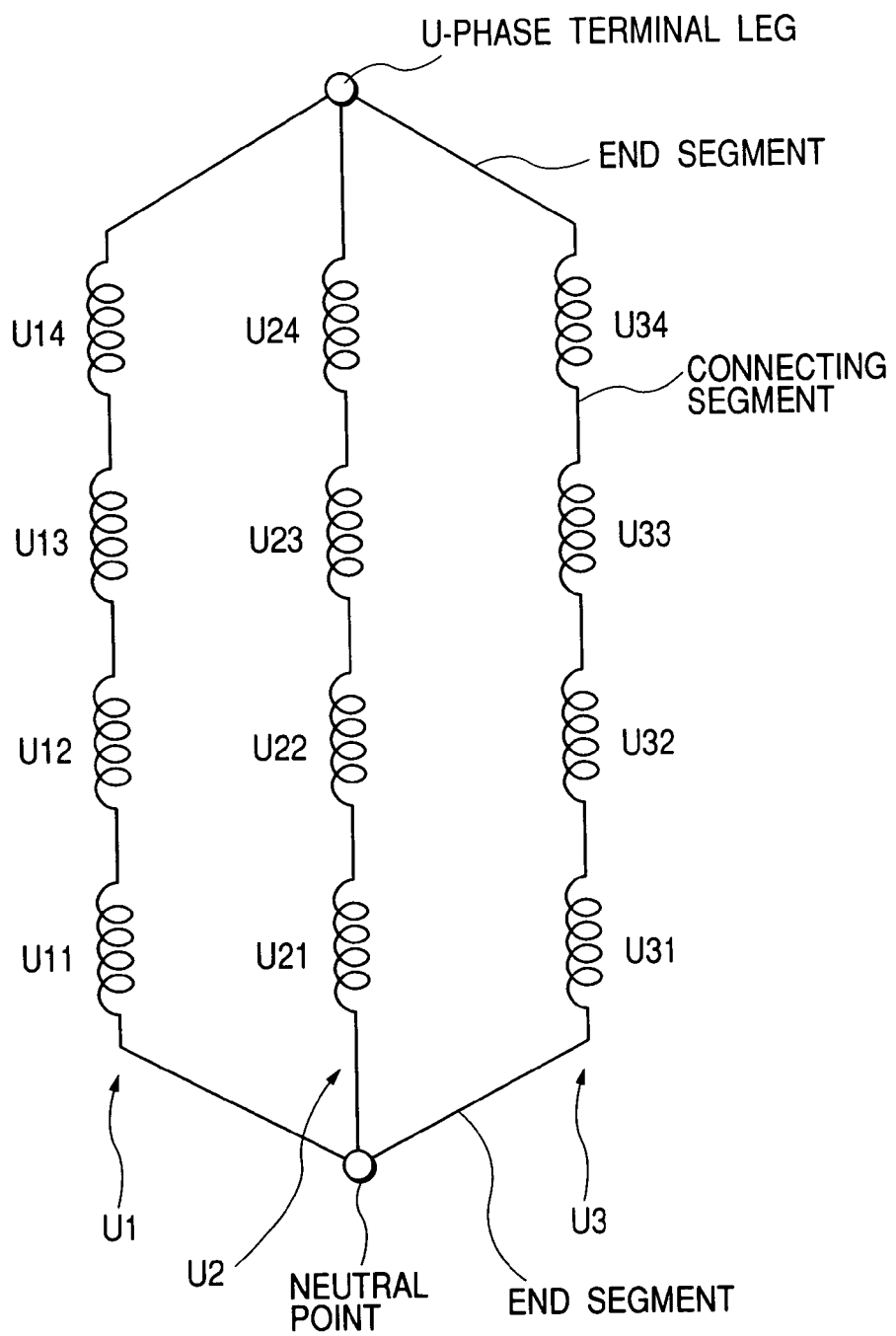
FIG. 9 is a circuit diagram which shows a U-phase winding of a stator coil of the invention.

The structure of the stator coil 3 made of three phase windings (will also be referred to as a U-phase coil, a V-phase coil, and a W-phase coil below) will be described below with reference to FIG. 9. The U-phase, V-phase, and W-phase coils are identical in structure, and the following discussion will refer to only the U-phase coil for the brevity of disclosure. FIG. 9 illustrates the U-phase coil made up of the segment set groups S1 to S4 arrayed in the radius direction of the stator core 1.

In this embodiment, the stator core 1 has a total of 108 slots 35 formed therein. Nine of the slots 35 are provided, three for each phase, within one magnetic pole pitch. The number of magnetic poles is twelve (12). Adjacent three of the slots 35 form a same-phase slot group within which the conductor segments 33 to which the same phase voltage is applied are placed. Within each of the slots 35, the sixteen layer positions P1 to P16 are, as described above, provided in sequence in the radius direction of the stator core 1.

The segment set group S1 occupies innermost four of the layer positions P1 to P16, i.e., the first to fourth layer positions P1 to P4 and forms three first partial phase coils for each phase. Specifically, in FIG. 9, the segment set group S1 forms first partial phase coils U11, U21, and U31. Each of the partial phase coils U11, U21, and U31 is placed in one of the three adjacent slots 35 of the same-phase slot group.

Similarly, the segment set group S2 which occupies the fifth to eighth layer positions P5 to P8 forms three second partial phase coils for each phase. Specifically, in FIG. 9, the segment set group S2 forms second partial phase coils U12, U22, and U32. Each of the partial phase coils U12, U22, and U32 is placed in one of the three adjacent slots 35 of the same-phase slot group.

The segment set group S3 which occupies the ninth to twelfth layer positions P9 to P12 forms three third partial phase coils for each phase. Specifically, in FIG. 9, the segment set group S3 forms third partial phase coils U13, U23, and U33. Each of the partial phase coils U13, U23, and U33 is placed in one of the three adjacent slots 35 of the same-phase slot group.

The segment set group S4 which occupies the thirteenth to sixteenth layer positions P13 to P16 forms three fourth partial phase coils for each phase. Specifically, in FIG. 9, the segment set group S4 forms fourth partial phase coils U14, U24, and U34. Each of the partial phase coils U14, U24, and U34 is placed in one of the three adjacent slots 35 of the same-phase slot group.

The partial phase coils U11, U12, U13, and U14 are placed in an outer one of the three adjacent slots 35 within the same-phase slot group. The partial phase coils U21, U22, U23, and U24 are placed in a middle one of the three adjacent slots 35 within the same-phase slot group. The partial phase coils U31, U32, U33, and U34 are placed in a remaining one of the three adjacent slots 35 within the same-phase slot group.

The partial phase coils U11, U12, U13, and U14 are joined in series to form a phase coil circuit U1. Similarly, the partial phase coils U21, U22, U23, and U24 are joined in series to form a phase coil circuit U2. The partial phase coils U31, U32, U33, and U34 are joined in series to form a phase coil circuit U3. A joint between adjacent two of the partial phase coils U11 to U34 within each of the slots 35 is achieved in a know manner using an anomalous conductor segment. For instance, a joint between the partial phase coils U12 and U13 may be achieved by drawing one of the conductor segments 33 (preferably, the large-sized conductor segment 331) of each of the partial phase coils U12 and U13 and inserting legs of a U-shaped conductor segment different in configuration from the conductor segments 33 into an unoccupied one of the slots 35 from which the conductor segment 33 of the partial phase coil U12 is drawn and an unoccupied one of the slots 35 from which the conductor segment 33 of the partial phase coil U13 is drawn. Similarly, a joint between the partial phase coils U11 and U12 may be achieved by drawing one of the conductor segments 33 of the partial phase coil U11 and inserting legs of a U-shaped conductor segment into the other of the unoccupied slots 35 of the partial phase coil U12 and an unoccupied one of the slots 35 from which the conductor segment 33 of the partial phase coil U11 is drawn.

In the other of the unoccupied slots 35 of the partial phase coil U12, a neutral point anomalous conductor segment (or a terminal leg) is inserted. Similarly, a terminal leg (or a neutral point anomalous conductor segment) is inserted into the other of the unoccupied slots 35 of the partial phase coil U14.

The phase coil circuits U1, U2, and U3 are connected electrically in parallel to complete the U-phase coil.

A standard production process of typical sequentially joined-segment stator coils will first be described below prior to describing features of the invention.

Head Twisting Process

First, a required number of two types of pine needle-like conductor segments are prepared: one is to make the large-sized conductor segments 332, and the other is to make the small-sized conductor segments 331. Each of the pine needle-like conductor segments is made up of a sharply curved head and a pair of straight legs extending in parallel.

Next, the pine needle-like conductor segments are machined to form U-shaped conductor segments. Legs of each of the U-shaped conductor segments are twisted or spread so that they are spaced from each other at a magnetic pole pitch. A required number of the U-shaped conductor segments are arrayed spatially in a circle so that they may be inserted into the slots 35 of the stator core 1 simultaneously. This step is achieved in a manner described below.

Figure 5:
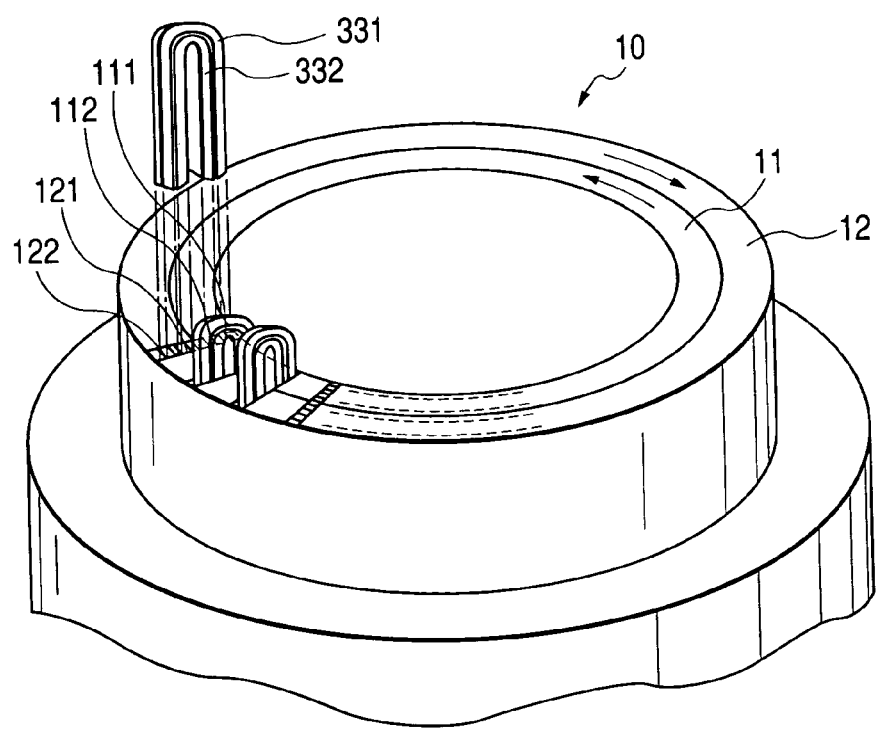
FIG. 5 is a perspective view which shows installation of a set of a small-sized conductor segment and a large-sized conductor segment within rings in a production process.

FIG. 5 shows a head twisting machine 10. The head twisting machine 10 includes a small ring 11 and a large ring 12 which are so installed on a base coaxially as to be rotatable relative to each other. The large ring 12 has pairs of holes 121 and 122 formed therein at a given interval in a circumferential direction thereof. The holes 121 and 122 of each pair are arrayed in a radius direction of the large ring 12. Similarly, the small ring 11 has pairs of the holes 111 and 112 formed therein at substantially the same interval as that of the pairs of the holes 121 and 122 in the circumferential direction thereof. The holes 111 and 112 are arrayed in the radius direction of the small ring 11. The hoes 111, 112, 121, and 122 are aligned in the radius direction of the rings 11 and 12. The U-shaped conductor segments for the large-sized conductor segments 331 are inserted at legs thereof into the innermost hole 111 and the outermost hole 112, while the U-shaped conductor segments for the small-sized conductor segments 332 are inserted at legs into the holes 112 and 121 located between the innermost and outermost holes 111 and 122. In the following discussion, the U-shaped conductor segments for making the large-sized conductor segments 331 and the small-sized conductor segments 332 will also be referred to as the large-sized and small-sized conductor segments 331 and 332 below for convenience.

Figure 6:
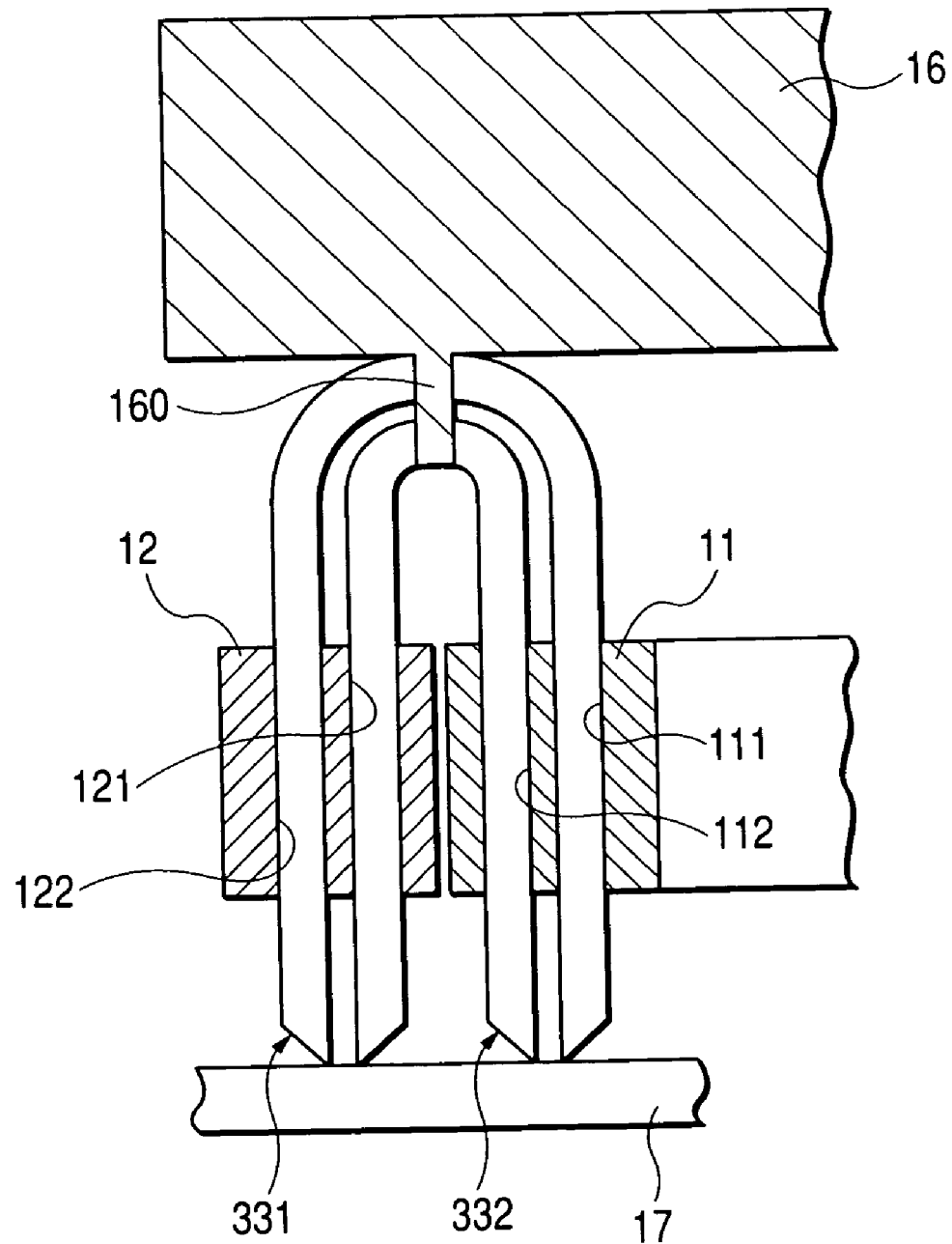
FIG. 6 is a partially sectional view which shows a pair of tines used to catch heads of a set of a small-sized conductor segment and a large-sized conductor segment when legs of the conductor segments are spread by rotating rings in opposite directions.

FIG. 6 is a partial sectional view which shows the large-sized conductor segments 331 and the small-sized conductor segments 332 inserted into the holes 111, 112, 121, and 122 of the small ring 11 and the large ring 12. A head press ring 16 is placed above the small and large rings 11 and 12 coaxially therewith. The head press ring 16 has installed on the bottom thereof pairs of tines 160 (only one is illustrated) each of which hold therein tips of the head portions of the large-sized conductor segment 331 and the small-sized conductor segment 332 arrayed at the same location in the circumferential direction of the rings 11 and 12. Specifically, after the large-sized and small-sized conductor segments 331 and 332 are placed in the holes 111, 112, 121, and 122, the head press plate 16 is moved downward to catch the tips of the large-sized and small-sized conductor segments 331 and 332 between the tines 160.

Subsequently, the small and large rings 11 and 12 are turned in opposite directions an angle equivalent to half a magnetic pitch relative to the head press plate 16, respectively, thereby spreading the legs of all the large-sized and small-sized conductor segments 331 and 332 to an angle equivalent to one magnetic pitch in the circumferential direction of the rings 11 and 12.

During the rotation of the rings 11 and 12, the heads of the large-sized and small-sized conductor segments 331 and 332 move downward toward the rings 11 and 12. The rotation of the rings 11 and 12 is, therefore, performed while shifting the head press plate 16 downward. A stopper plate 17 is disposed beneath the rings 11 and 12. The stopper plate 17 works to control dropping of the large-sized and small-sized conductor segments 331 and 332. Instead of the stopper plate 17, an outer stopper plate for outer two of the legs and an inner stopper plate for inner two of the legs may be used. In this case, the outer stopper plate is secured to the large ring 12 to be rotatable in unison. The inner stopper plate is secured to the small ring 11 to be rotatable in unison.

After completion of the twisting of the heads of the large-sized and small-sized conductive segments 331 and 332, the ring 11 and 12 are removed from the conductor segments 331 and 332 while holding the conductor segments 331 and 332 through the head press plate 16.

Insertion of End of Conductor Segment to Slot

The small-sized conductor segments 332 are removed from the rings 11 and 12 and inserted into, as shown in FIG. 4, the middle inside layer position and the middle outside layer position of the slots 35 of the stator core 1. Similarly, the large-sized conductor segments 331 are removed from the rings 11 and 12 and inserted into the outermost layer position and the innermost layer position of the slots 35. The head press plate 16 may be used to hold the large-sized and small-sized conductor segments 331 and 332 upon insertion to the slots 35, thereby enabling the conductor segments 331 and 332 to be fitted in the slots 35 simultaneously. After completion of the insertion, the head press plate 16 is removed from the conductor segments 331 and 332.

The formation of the large-sized and small-sized conductor segments 331 and 332 and insertion thereof into the slots 35 are not limited to the above described steps and alternatively achieved in other known steps.

End Twisting Process (End Spreading Process)

In an end twisting process as discussed below, the end portion 331g continuing from the outermost slot-inserted portion 331b and the end portion 331f continuing from the innermost slot-inserted portion 331a of the large-sized conductor segment 331 are spread in opposite directions. The end portion 332f continuing from the middle inside slot-inserted portion 332b and the end portion 332g continuing from the middle outside slot-inserted portion 332b of the small-sized conductor segment 332 are spread in opposite directions. An angular interval between the slot-inserted portions 311f and 332f is equivalent to one magnetic pole pitch. Similarly, an angular interval between the slot-inserted portions 331g and 332g is equivalent to one magnetic pole pitch.

Figure 7:
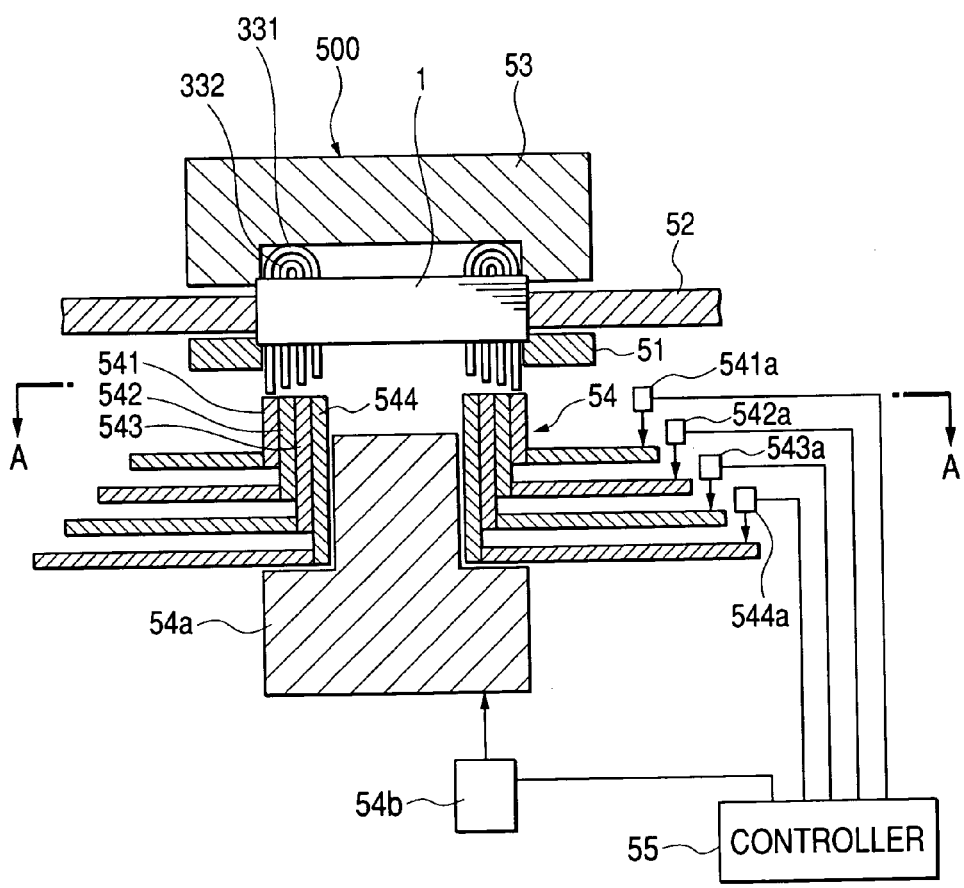
FIG. 7 is a vertical sectional view which shows a stator coil twisting machine.
Figure 8:
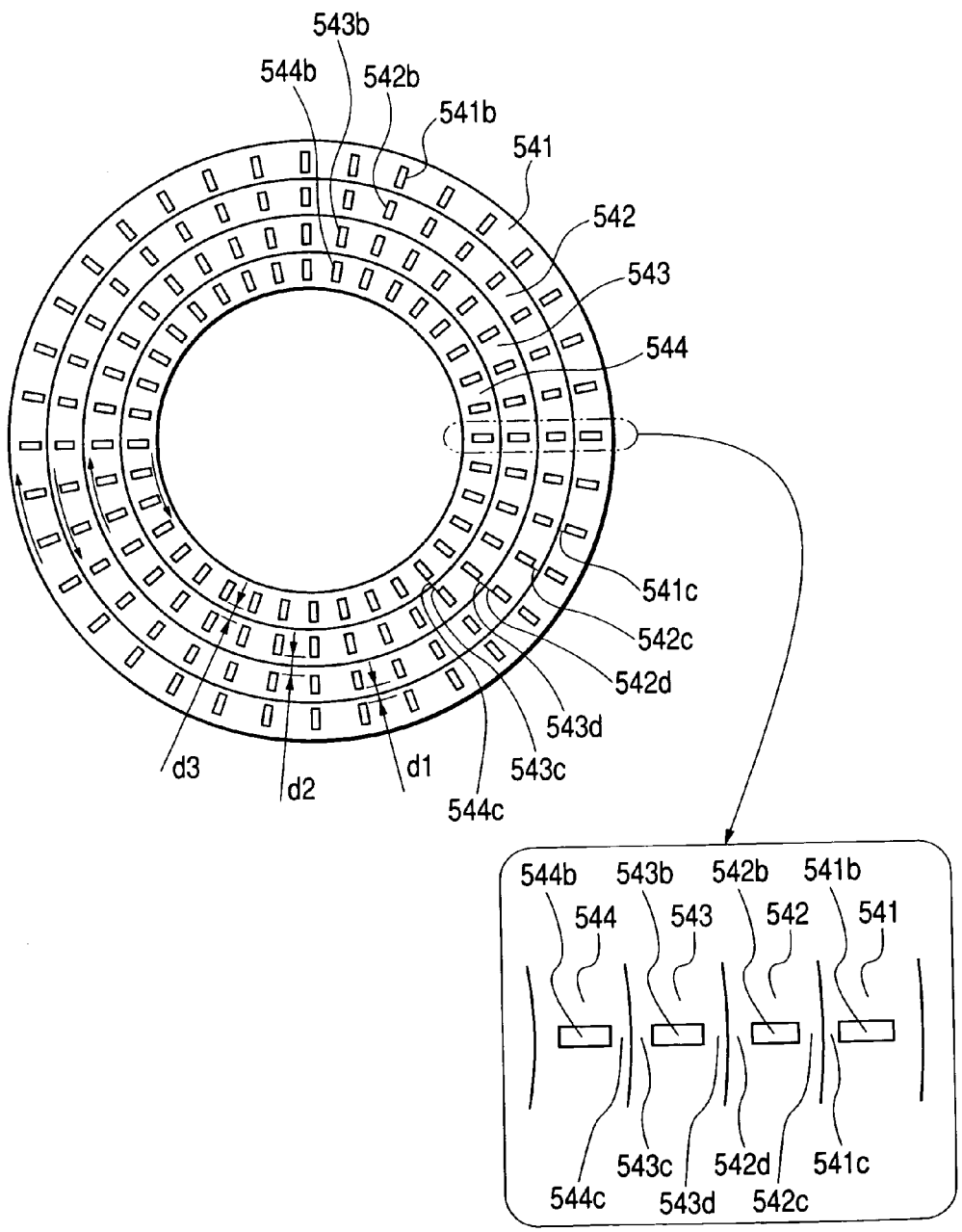
FIG. 8 is a plane view, as taken along the line A—A in FIG. 7, which shows rings of the stator coil twisting machine.

The end twisting process will be described with reference to FIGS. 7 and 8. FIG. 7 is a vertical sectional view which shows a stator coil twisting machine 500. FIG. 8 is a sectional view as taken along the line A—A in FIG. 7.

The stator coil twisting machine 500 consists of a work mount 51, a clamper 52, a work press 53, a twister 54, a lifting shaft 54a, rotary drive mechanisms 541a to 544a, a lifting mechanism 54b, and a controller 55. The work mount 51 is designed to hold the periphery of the stator core 1. The clamper 52 works to control radial movement of the stator core 1 and hold it. The work press 53 works to hold the stator core 1 from moving vertically. The twister 54 works to twist the end portions of the conductor segments 33 (i.e., the large-sized and small-sized conductor segments 331 and 332) projecting outside the stator core 1. The lifting shaft 54a works to move the twister 54 vertically. The rotary drive mechanisms 541a to 544a work to rotate the twister 54 in the circumferential direction of the stator core 1. The lifting mechanism 54b works to move the lifting shaft 54a vertically. The controller 55 works to control operations of the rotary drive mechanisms 541a to 544a and the lifting mechanism 54b.

The twister 54 is made up of four hollow cylinders 541 to 544 arrayed coaxially. The cylinders 541 to 544 are coupled to the rotary drive mechanisms 541a to 544a, respectively, so that they may be turned independently. The cylinders 541 to 544 are moved vertically by the lifting mechanism 54b through the lifting shaft 54a. This vertical movement may be achieved simultaneously with the rotation of the cylinders 541 to 544.

The cylinders 541 to 544 each have, as clearly shown in FIG. 8, segment end holding bores 541b to 544b formed in upper surfaces thereof into which tips of the end portions 331f, 331g, 332f, and 332g of the conductor segments 33 are to be inserted. The segment end holding bores 541b to 544b are identical in number with the slots 35 of the stator core 1 and arrayed at a given interval in the circumferential direction of the cylinders 541 to 544.

Partition walls 541c to 544c, 542d, and 543d are, as shown in FIG. 8, formed in order to avoid communication among the bores 541b to 544b arrayed adjacent in the radius direction of the cylinders 541 to 544. The thickness of the partition walls 541c to 544c, 542d, and 543d are so selected that the interval d2 between the partition walls 542d and 543d of middle two of the cylinders 541 to 544 may be greater than the interval d1 between the partition walls 541c and 542c of outer two of the cylinders 541 to 544 and the interval d3 between the partition walls 543c and 544c of inner two of the cylinders 541 to 544.

In operation, the stator core 1 within which the conductor segments 33 are fitted is first mounted on the work mount 51. Next, the periphery of the stator core 1 is clamped by the clamper 52. Subsequently, the work press 53 is placed on the stator core 53 in abutment to an upper surface of the stator core 1 and head portions 331c of the large-sized conductor segments 331 to hold the stator core 1 and the conductor segments 33 from moving vertically.

After the stator core 1 is fixed by the clamper 52 and the work mount 53, the twister 54 is lifted up through the lifting shaft 54a to insert the end portions 331f, 331g, 332f, and 332g of the conductor segments 33 into the bores 541b to 544b of the cylinders 541 to 544.

The bores 541b to 544b are so formed as to receive only the tips of the end portions 331f, 331g, 332f, and 332g of the conductor segments 33 to be welded in a following process. The end portions 331f, 331g, 332f, and 332g are tapered in order to facilitate ease of insertion to the bores 541b to 544b.

After the end portions 331f, 331g, 332f, and 332g of the conductor segments 33 are inserted into the bores 541b to 544b of the twister 54, the twister 54 is turned and moved vertically by the rotary drive mechanisms 541a to 544a and the lifting mechanism 54b.

The rotation of the twister 54 is accomplished by turning the cylinders 541 and 543 a first angle in a clockwise direction and the cylinders 542 and 544 a second angle in a counterclockwise direction. The first and second angles may not be identical in absolute value with each other as long as the sum of absolute values of the first and second angles agrees with desired pitches between the slots 35.

Subsequently, the controller 55 controls the lifting mechanism 54b and the rotary drive mechanisms 541a to 544a and lifts up the twister 54 while rotating it so as to keep the length of the end portions 331f, 331g, 332f, and 332g of the conductor segments 33 between outlets of the slots 35 and inlets of the bores 541b to 544b of the twister 54 constant. The lifting of the twister 54 is preferably achieved so as to have the end portions 331f, 331g, 332f, and 332g of the conductor segments 33 follow an arc-shaped locus. Such twisting along the arc-shaped locus preferably continues until an angle of the twisting exceeds half a magnetic pole pitch (T/2) by a given value in order to avoid unwanted deformation of the conductor segments 33 arising from the spring back.

Afterwards, the rotary drive mechanisms 541a to 544a are turned in a direction reverse to that of the above step while moving the lifting mechanism 54b downward to terminate the twisting process of the conductor segments 33. The twister 54 is moved downward to remove the end portions 331f, 331g, 332f, and 332g of the conductor segments 33 from the bores 541b to 544b of the cylinders 541 to 544. Subsequently, the twister 54 is rotated by the rotary drive mechanisms 541a to 544a and returned back to an initial position. Finally, the clamper 52 and the work press 53 are removed from the stator core 1. The stator core 1 within which the twisted conductor segments 33 are fitted is taken out of the stator coil twisting machine 500.

As apparent from the above discussion, the twisting process includes the steps of spreading or bending the ends of the conductor segments 33 only in the circumferential directions of the stator core 1, pressing the ends of the conductor segments 33 both in the circumferential directions and vertical direction of the stator core 1 to bend them greatly, pressing the ends of the conductor segments 33 further both in the circumferential directions and the vertical direction to compensate for the spring back, and returning the ends of the conductor segments 33 back to a desired angle.

The twister 54 is designed to move in the axial direction of the stator core 1 as well as in the circumferential direction thereof, thereby making it possible to twist or bend the end portions 331f, 331g, 332f, and 332g of the conductor segments 33 along the arc-shaped locus so as to keep constant the length of the end portions 331f, 331g, 332f, and 332g of the conductor segments 33 between the outlets of the slots 35 and the inlets of the bores 541b to 544b of the twister 54, that is, the length of the end portions 331f, 331g, 332f, and 332g minus the length of the tips 331d, 331e, 332d, and 332e to be welded. This avoids dislodgement of the conductor segments 33 from the bores 541b to 544b of the cylinders 541 to 544.

Moreover, only the tips 331d, 331e, 332d, and 332e of the conductor segments 33 are inserted into the bores 431b to 544b, thereby facilitating the avoidance of the dislodgement of the conductor segments 33 from the bores 541b to 544b.

Welding Process

This process is substantially the same as a conventional one.

Specifically, after completion of the above twisting process, the tips of the conductor segments 33 located at the first and second layer positions in each of the slots 35 are, as shown in FIGS. 1 and 2, joined by, for example, arc welding. Similarly, the tips of the conductor segments 33 located at the third and fourth layer positions are welded. This completes the stator coil 3.

Feature of this Embodiment in Head Twisting Process

A unique feature in the head twisting process produced by this embodiment will be described below with reference to FIG. 10.

The head twisting machine 10 is identical in basic operation with the one shown in FIG. 6 and different therefrom in the following.

An essential distinction between the head twisting machine 10 and the one of FIG. 6 is that the head press plate 16 is designed to be rotatable. The head twisting machine 10 includes a head press mechanism 1600 which is installed coaxially with a segment turning mechanism 2000 equipped with the rings 11 and 12. The head twisting machine 10 also includes a lifting cylinder 1601 which is moved vertically by an actuator (not shown). The lifting cylinder 1601 retains on the bottom surface thereof the head press plate 16 to be rotatable through thrust bearings 16c and 16d. The thrust bearing 16c works to bear the weight of the head press plate 16. The thrust bearing 16d works to allows the head press plate 16 to rotate free from an reactive force produced by a press of the head press plate 16 on the heads of the conductor segments 33.

The head press plate 16 is located above the head tips 33a of each of the conductor segments 33 and has the pairs of tines 160 identical with the ones illustrated in FIG. 6. The head press plate 16 has a frusto-conical protrusion 16a which serves to hold the heads of the conductor segments 33 from moving inwardly when the legs of the conductor segments 33 are twisted or spread. The head press plate 16 also has an annular extension 163 which serves to hold the heads of the conductor segments 33 from moving outwardly when the legs of the conductor segments 33 are spread.

The conductor segments 33 are, as already described, broken down into sets of the large-sized conductor segment 331 and the small-sized conductor segment 332. In the following discussion, each set of the large-sized and small-sized conductor segments 331 and 332 will also be referred to as a segment set 33. Portions of each of the conductor segments 33 which are placed within the rings 11 and 12 and extend downward to abut the upper surface of the stopper disc 17 will be referred to as legs 33c below. Portions of the head of each of the conductor segments 33 which extend straight between the U-shaped head tip 33a and the legs 33c and are disposed above the rings 11 and 12 will be referred to as middle straight portions 33b below which are to be twisted by the head twisting mechanism 10 to form slant head portions inclined to the legs 33c at a given angle.

In operation, the head press mechanism 1600 is moved downward, while the stopper plate 17 is lifted up to catch the heads of the segment sets 33 through the pairs of tines 160 in the circumferential direction of the rings, 11 and 12. After a required length of the middle straight portions 33b of each of the segment sets 33 is set up, the rings 11 and 12 are turned in opposite directions a given angle equivalent to half a magnetic pole pitch to twist or spread the middle straight portions 33b in the circumferential directions of the rings 11 and 12 to form the slant head portions. This causes the head tips 33a to drop downward, thus resulting in an increase in vertical clearance between the head tops 33a and the tines 160. The head press plate 16 is urged downward at all times so as to keep that vertical clearance constant, thus ensuring the stability of a nip of the head tips 33a through the tines 160. Side surfaces of the tines 160 serve to hold the head tips 33a of the segment sets 33 during bending the middle straight portions 33b from radius to circumferential direction as viewed in the axial direction of the rings 11 and 12.

Figure 10:
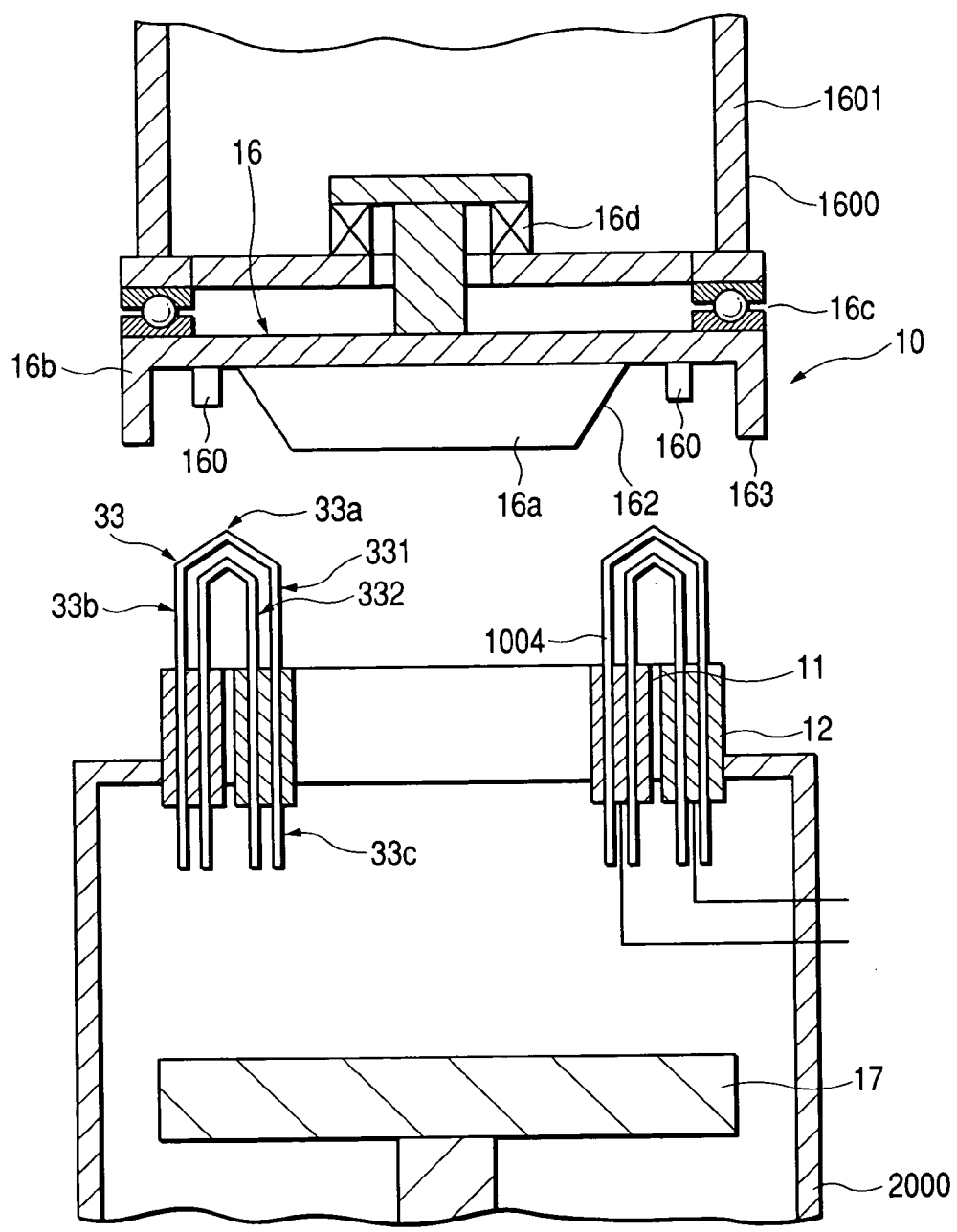
FIG. 10 is a vertical sectional view which shows a head twisting machine according to a preferred embodiment of the invention.
Figure 11:
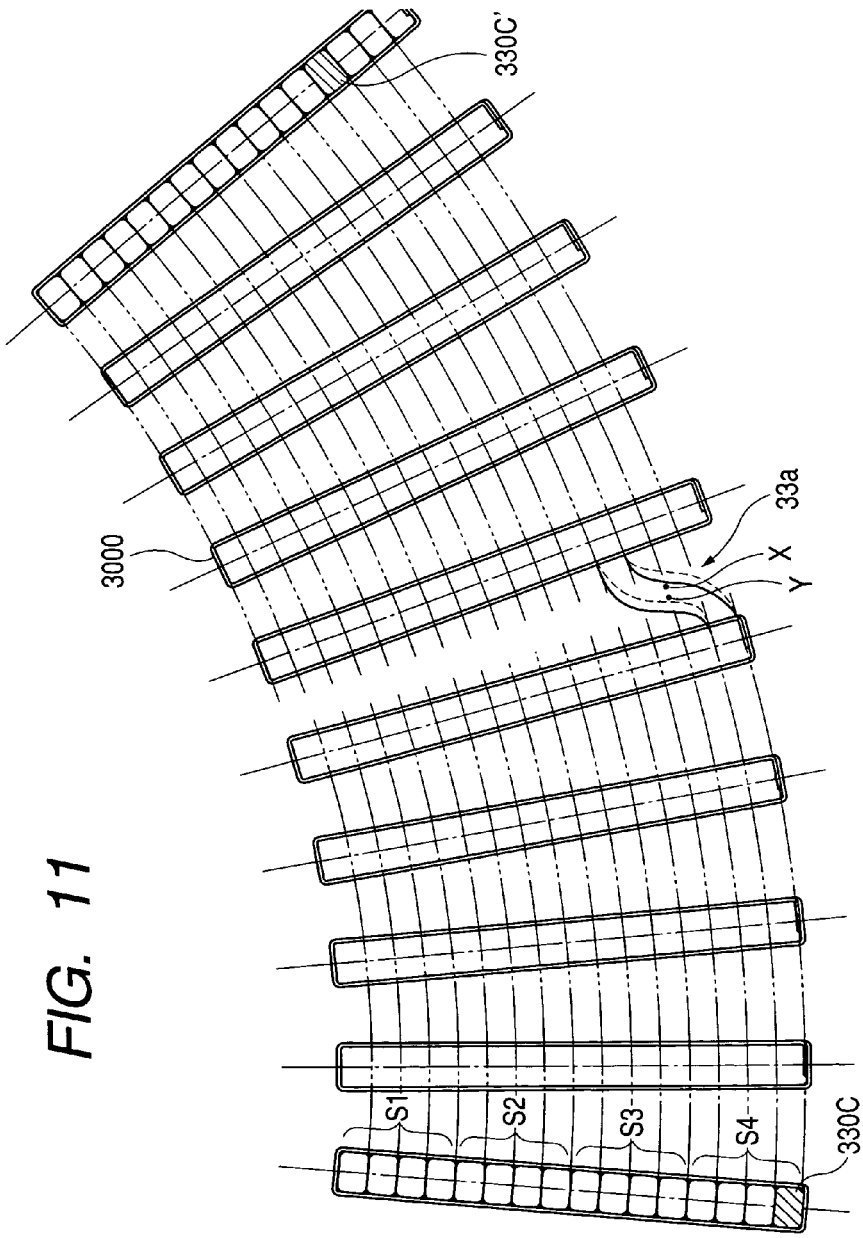
FIG. 11 is an explanatory view which shows a shift in location of a head of each conductor segment when twisted by the machine of FIG. 10.

FIG. 11 shows the twisted head tips 33a of the conductor segments 33, as viewed in the axial direction of the rings 11 and 12. Numeral 3000 indicates slots formed in the rings 11 and 12 within each of which a total of the sixteenth legs 33c of the four segment set groups S1 to S4 are arrayed adjacent to each other in the radius direction of the rings 11 and 12. The same number of slots 3000 as the slots 35 of the stator core 1 are arrayed at a regular interval in the rings 11 and 12. The sixteen legs 33c are in practice fitted within four pairs of the rings 11 and 12 arranged coaxially. FIG. 10 shows only one pair of the rings 11 and 12 for the brevity of illustration.

The segment set groups S1 to S4 may alternatively be subjected to the twisting process independently using one pair of the rings 11 and 12, as illustrated in FIG. 10.

In FIG. 10, X indicates the center of the head top 33a when the head press plate 16 is not rotated. Y indicates the center of the head tip 33a when the head press plate 16 is rotated.

As described already, the head press plate 16 is designed to be rotatable together with the tines 160 when subjected to the torque exerted thereon by the conductor segments 33 so as to eliminate it. This rotation results in a great decrease in stress produced by the tines 160 acting on a portion of the insulating film covering the head tips 33a of the conductor segments 33 as compared with a case where the head press plate 16 is fixed, thereby ensuring the electrical insulation of the conductor segments 33.

To explain the above in detail, when the rings 11 and 12 are rotated in opposite directions to spread the legs 33c of the conductor segments 33, an outer one of the pair of legs 33c of each of the conductor segments 33 travels a distance longer than that of the inner one, thereby causing the middle straight portion 33b leading to the outer leg 33c to undergo a pull that is stronger than that exerted on the middle straight portion 33b leading to the inner leg 33c in the clockwise direction, as viewed in FIG. 11, which results in production of torque acting on the middle straight portions 33c to shift them in the clockwise direction. Numerals 330C and 330C' denote the legs 33c of an outermost one of the large-sized conductor segments 331.

The head twisting machine 10 is, as described above, designed to allow the head press plate 16 to rotate together with the tines 160 in response to the above torque acting thereon. The rotation of the head press plate 16 causes the center of the head tip 33a of the conductor segment 33 to be shifted from X to Y in FIG. 11, so that an angle, as measured from a vertex defined on an axis of the stator coil 3, between a center of the head tip 33a of each of the segments 33 as defined in a circumferential direction of the stator coil 3 and an outer one of the legs 33c of the segment 33 is smaller than an angle between the center and an inner one of the legs 33c, thereby absorbing the movement of the head tip 33a and the middle straight portion 33b relative to the tines 160 in the clockwise direction. This avoids rubbing of the insulating films on the surfaces of the head tip 33a and the middle straight portion 33b, thus ensuring the electrical insulation of the conductor segments 33.

The head press plate 16 may alternatively be designed to be turned an angle between the points X and Y using an actuator in synchronization with rotation of the rings 11 and 12.

The above stress arises from the fact that the rings 11 and 12 are rotated an angle equivalent to half a magnetic pole pitch. The stress may be eliminated by fixing the center of the head tip 33a of the conductor segment 33 at the point Y before the legs 33c are spread, rotating the outer ring 12 an angle of one-half of the magnetic pole pitch minus an angular difference Δ between the points Y and X (Y−X), and rotating the inner ring 11 an angle of one-half of the magnetic pole pitch plus the angular difference Δ. In FIG. 11, solid lines indicate twisting or deformation of the head top 33a of the conductor segment 33 in this modification, while broken lines indicates such deformation when the legs 33c are spread in the conventional manner.

Another modification of the head twisting process will be described with reference to FIG. 12.

This modification uses a head twisting machine different from the one of FIG. 6 only in configuration of opposed inner surfaces of the tines 160 working to catch the head tip 33a of the conductor segment 33 in the circumferential direction of the rings 11 and 12.

One of each pair of the tines 160, as designated at 1601, has a chamfered inner surface 1601a which is to abut the boundary between the head tip 33a and an outer one of the pair of the middle straight portions 33b of the conductor segment 33. The other of the tines 160, as designated at 1602, has a chamfered inner surface 1602a which is to abut the boundary between the head tip 33a and an inner one of the pair of the middle straight portions 33b.

The outer middle straight portion 33b is pulled in the clockwise direction upon rotation of the ring 12, thus causing the tine 1601 to be urged inwardly in the radius direction of the rings 11 and 12 by the outer middle straight portion 33b or a portion of the head tip 33a close to the outer middle straight portion 33b.

The inner middle straight portion 33b is pulled in the counterclockwise direction upon rotation of the ring 11, thus causing the tine 1602 to be urged outward in the radius direction of the rings 11 and 12 by the outer middle straight portion 33b or a portion of the head tip 33a close to the inner middle straight portion 33b.

The chamfered surface 1601a of the tine 1601 is greater in area than the chamfered surface 1602a of the tine 1602. In other words, the chamfered surface 1601a of the tine 1601 is greater in radius of curvature than the chamfered surface 1602a of the tine 1602. This enables a required length of the outer middle straight portion 33b to be deformed to be equal to that of the inner middle straight portion 33b to be deformed even when absolute values of angles of rotation of the rings 11 and 12 are identical with each other, thereby preventing the outer middle straight portion 33b from stretching the inner middle straight portion 33b in the circumferential direction of the rings 11 and 12 and also causing the radius of curvature of the boundary (i.e., a portion of the conductor segment 33 abutting the chamfered surface 1601a) between the head tip 33a and the outer middle straight portion 33b to be greater than that of the boundary (i.e., a portion of the conductor segment 33 abutting the chamfered surface 1602a) between the head tip 33a and the inner middle straight portion 33b. This results in a great decrease in stress which, in the conventional structure, acts on the insulating film on the portion of the conductor segment 33 abutting the chamfered surface 1601a, thus ensuring desired electrical insulation of the stator coil 1.

Figure 12:
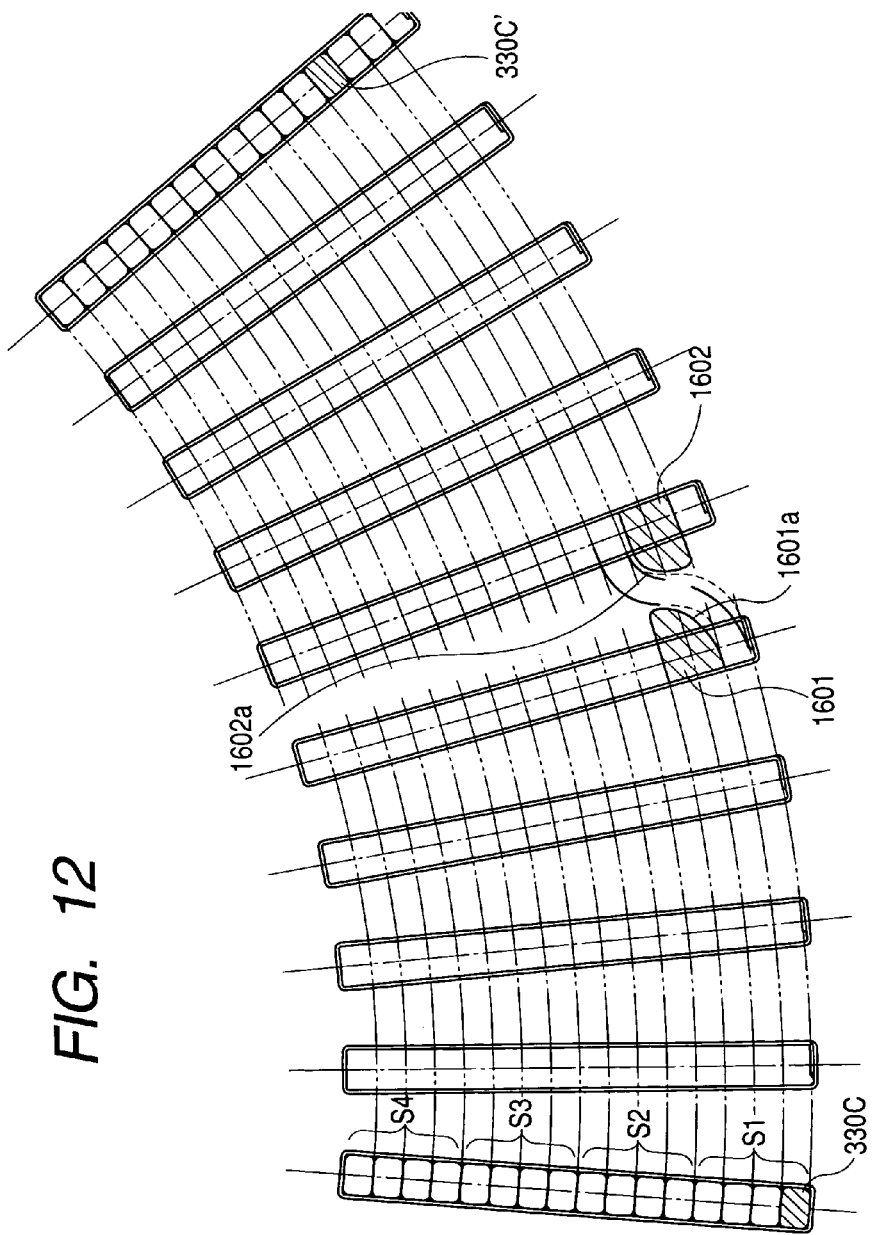
FIG. 12 is a partially sectional view which shows a modification of tines used to catch heads of conductor segments when legs of the conductor segments are spread by the machine of FIG. 10.
Figure 13:
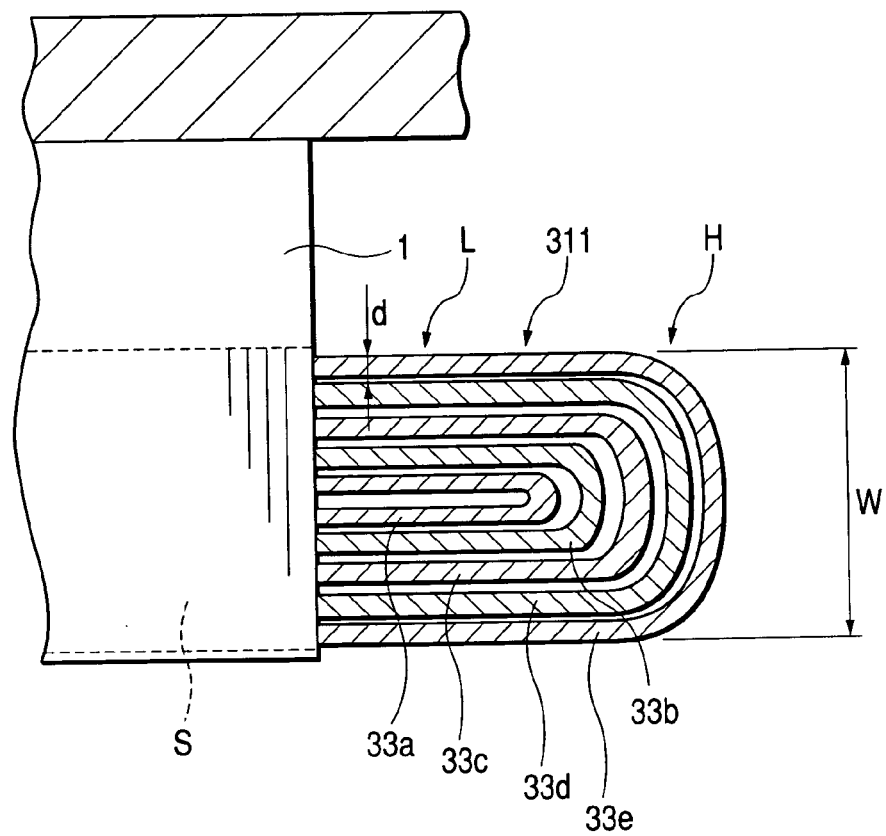
FIG. 13 is a partially sectional view which shows a segment head-side coil end of a conventional stator coil.

In FIG. 12, solid lines indicate twisting or deformation of the head tip 33a of the conductor segment 33 in this modification, while broken lines indicates such deformation when the legs 33c are spread in the conventional manner.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A production method of a sequentially joined-segment stator coil of a rotary electric machine comprising:

preparing segments each including a head and a pair of legs extending straight in parallel to each other from ends of the head, the head being made up of a substantially U-shaped tip portion and a pair of head straight portions extending from the tip portion in alignment with the legs;

preparing a plurality of rings arrayed coaxially with each other to be rotatable relative to each other;

holding the legs of each of the segments in the rings, respectively;

catching the tip portion of the head of each of the segments through a pair of tines in abutment to the tip portion in a circumferential direction of said rings, the tines being installed on a head press member which is disposed away from said rings in an axial direction of the rings and so designed as to be movable selectively to and away from said rings;

moving said head press member toward said rings and, at the same time, rotating said rings in opposite directions to spread the legs of each of the segments through a given angle, thereby twisting the head straight portions of each of the heads to form head slant portions;

removing said segments from the rings and the tines and inserting said segments into slots in a stator core; and joining said segments in said stator core in sequence to complete a stator coil;

wherein the head press member retains each of the pairs of tines to be rotatable about an axis extending in alignment with an axis about which the rings rotate, each of the pairs of tines being allowed to rotate following rotation of the rings.

2. A sequentially joined-segment stator coil of a rotary electric machine produced by the production method as set forth in claim 1, wherein an angle, as measured from a vertex defined on an axis of the stator coil, between a center of the tip portion of the head of each of the segments as defined in a circumferential direction of the stator coil and an outer one of the legs of the segment is smaller than an angle between said center and an inner one of the legs.

3. A production method of a sequentially joined-segment stator coil of a rotary electric machine, comprising:

preparing segments each including a head and a pair of legs extending straight in parallel to each other from ends of the head, the head being made up of a substantially U-shaped tip portion and a pair of head straight portions extending from the tip portion in alignment with the legs;

preparing a plurality of rings arrayed coaxially with each other to be rotatable relative to each other;

holding the legs of each of the segments in the rings, respectively;

catching the tip portion of the head of each of the segments through a pair of tines in abutment to the tip portion in a circumferential direction of said rings, the tines being installed on a head press member which is disposed away from said rings in an axial direction of the rings and so designed as to be movable selectively to and away from said rings;

moving said head press member toward said rings and, at the same time, rotating said rings in opposite directions to spread the legs of each of the segments through a given angle, thereby twisting the head straight portions of each of the heads to form head slant portions;

removing said segments from the rings and the tines and inserting said segments into slots in a stator core; and joining said segments in said stator core in sequence to complete a stator coil, wherein one of each pair of the tines which is urged inwardly of the rings by the tip portion of the head of a corresponding one of the segments has a first chamfered surface to abut to the tip portion, and the other tine which is urged outward of the rings by the tip portion of the head of the corresponding one of the segments has a second chamfered surface to abut to the tip portion, the first chamfered surface being greater in radius of curvature than the second chamfered surface.

4. A production method as set forth in claim 3, wherein said segments are broken down into a plurality of segment groups each of which is made up of sets of the segments arrayed in a circumferential direction of the rings, the segment groups being arrayed in a radius direction of the rings.

5. A production method as set forth in claim 4, wherein each of the sets of the segments includes a small-sized segment and a large-sized segment which is placed to extend over the small-sized segment.

* * * * *